Feb. 13, 1934.  G. KOMAREK  1,946,628
PROCESS OF COKING COAL
Filed May 12, 1930   14 Sheets-Sheet 1
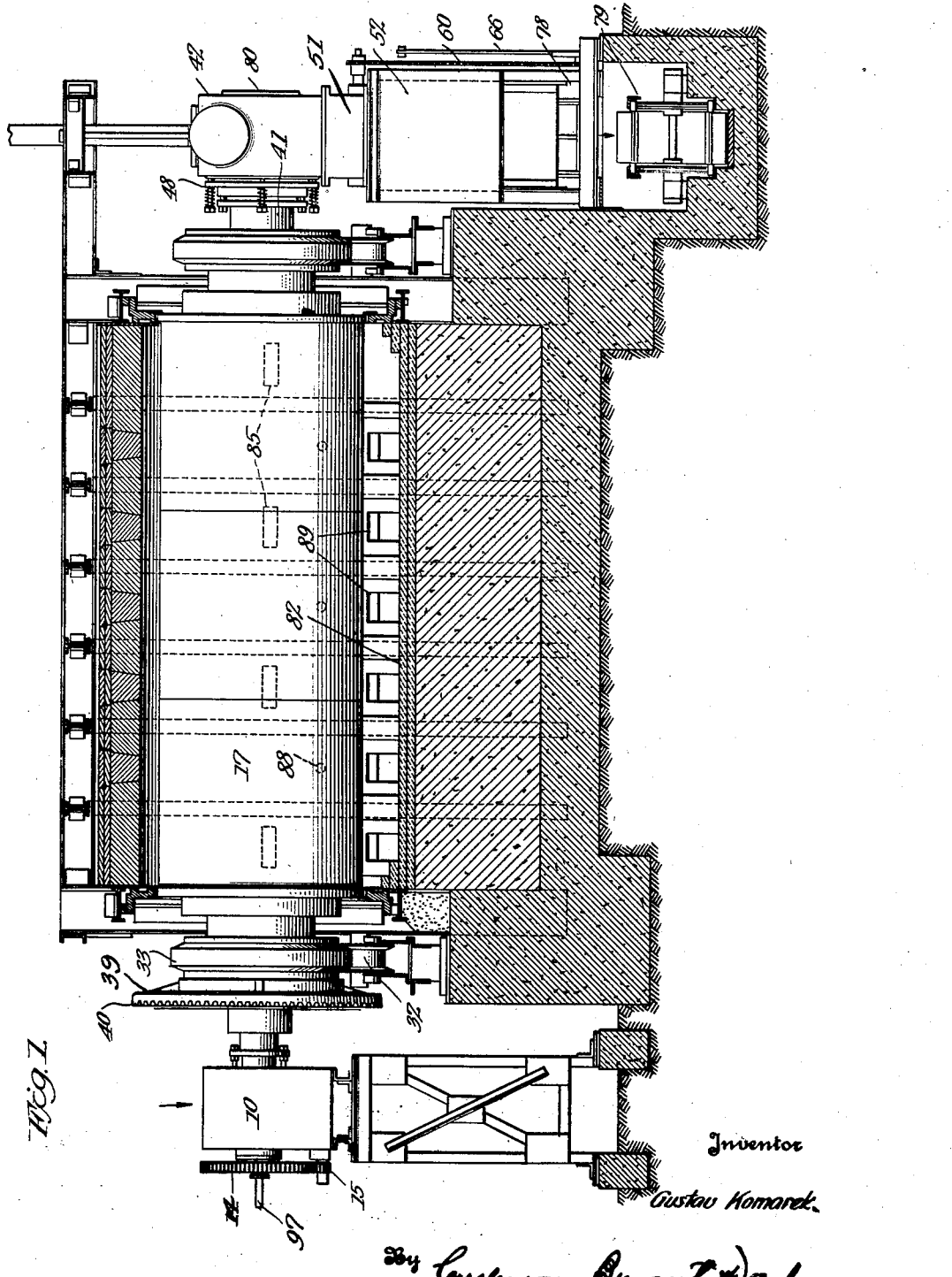

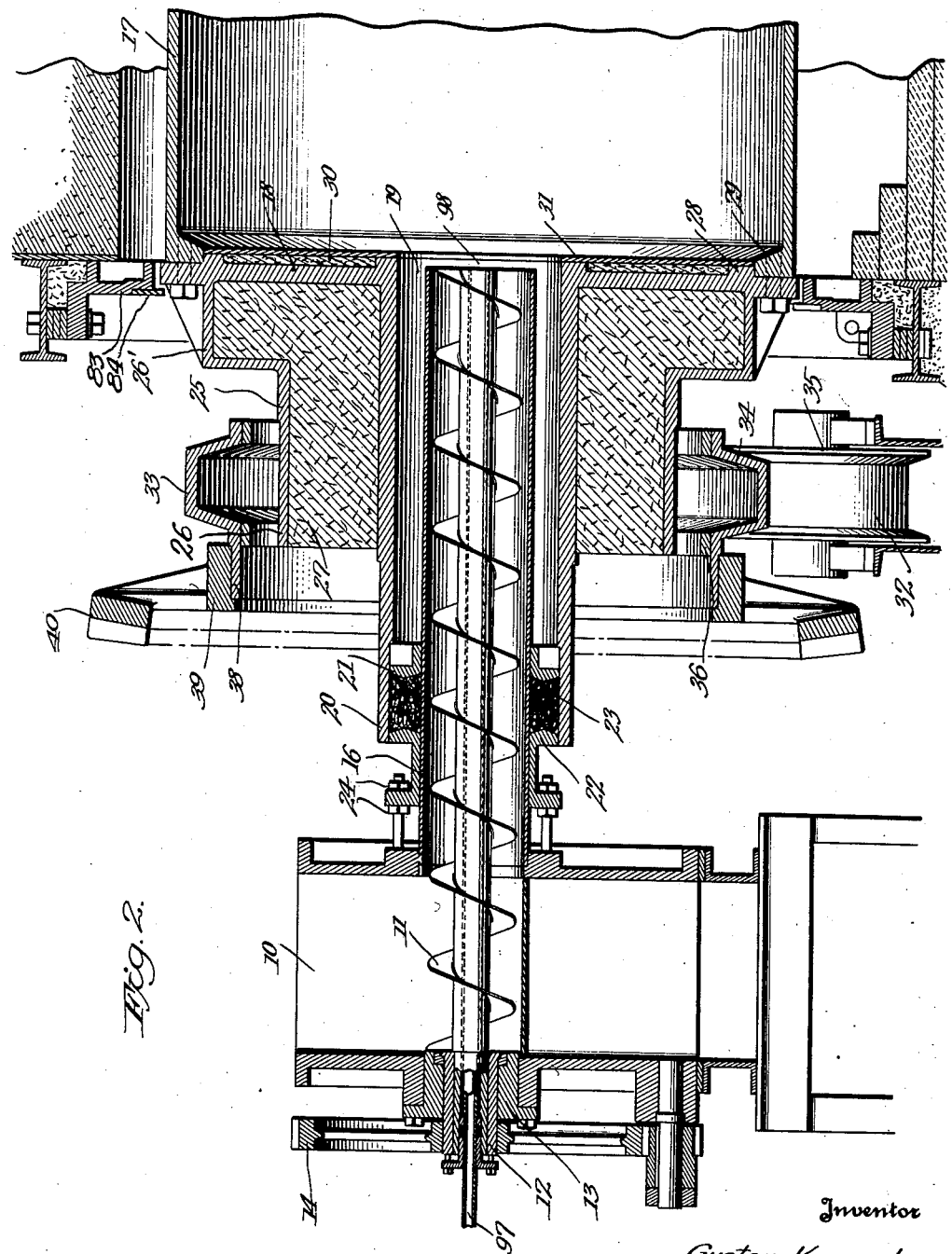

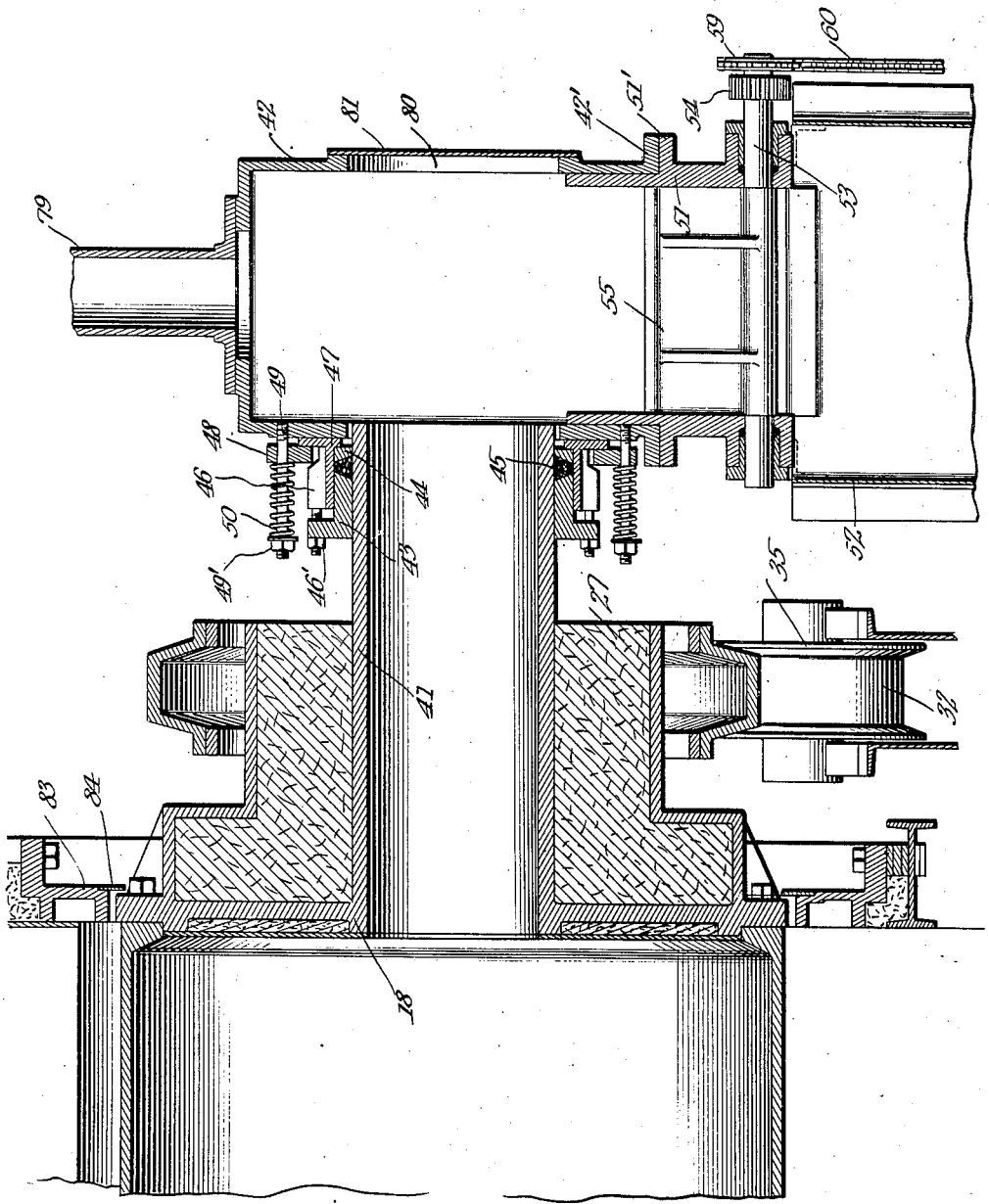

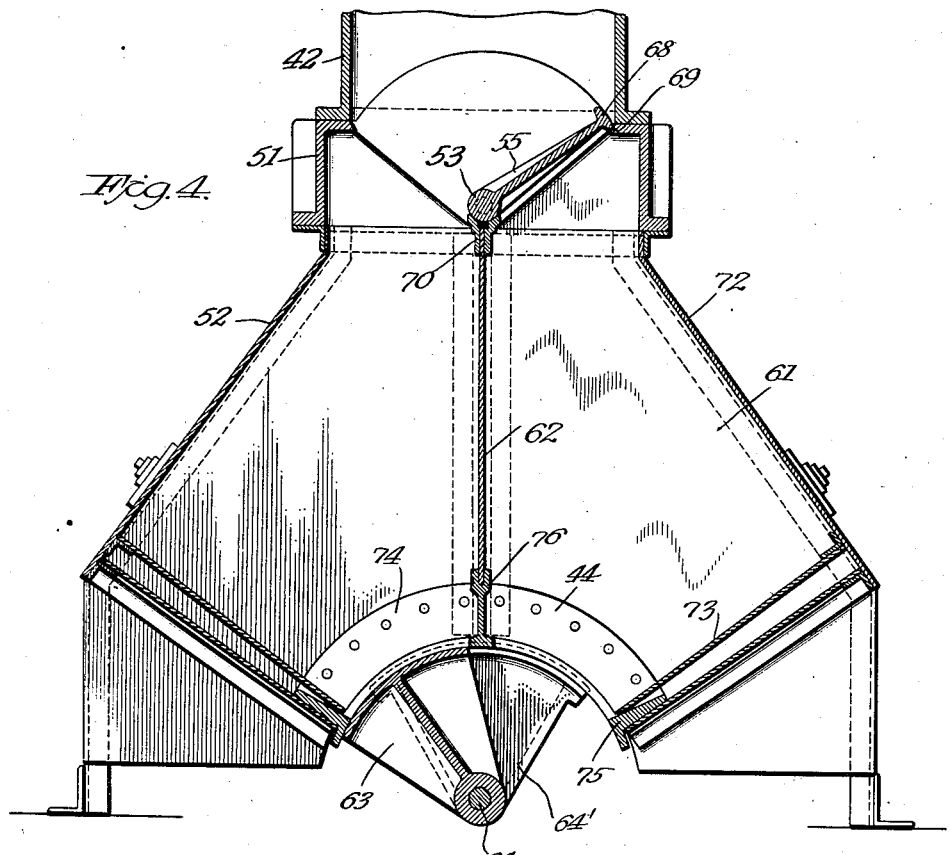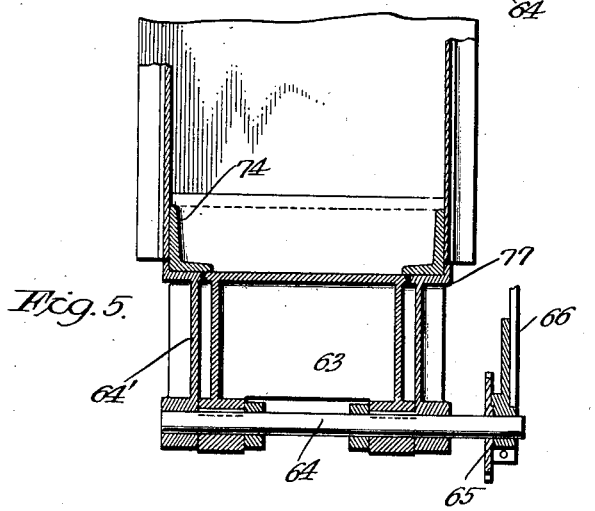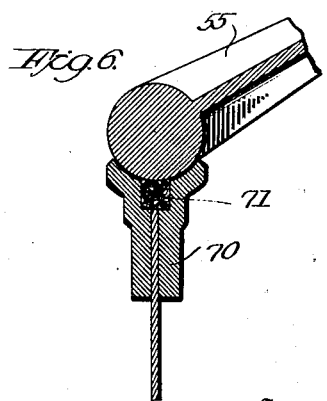

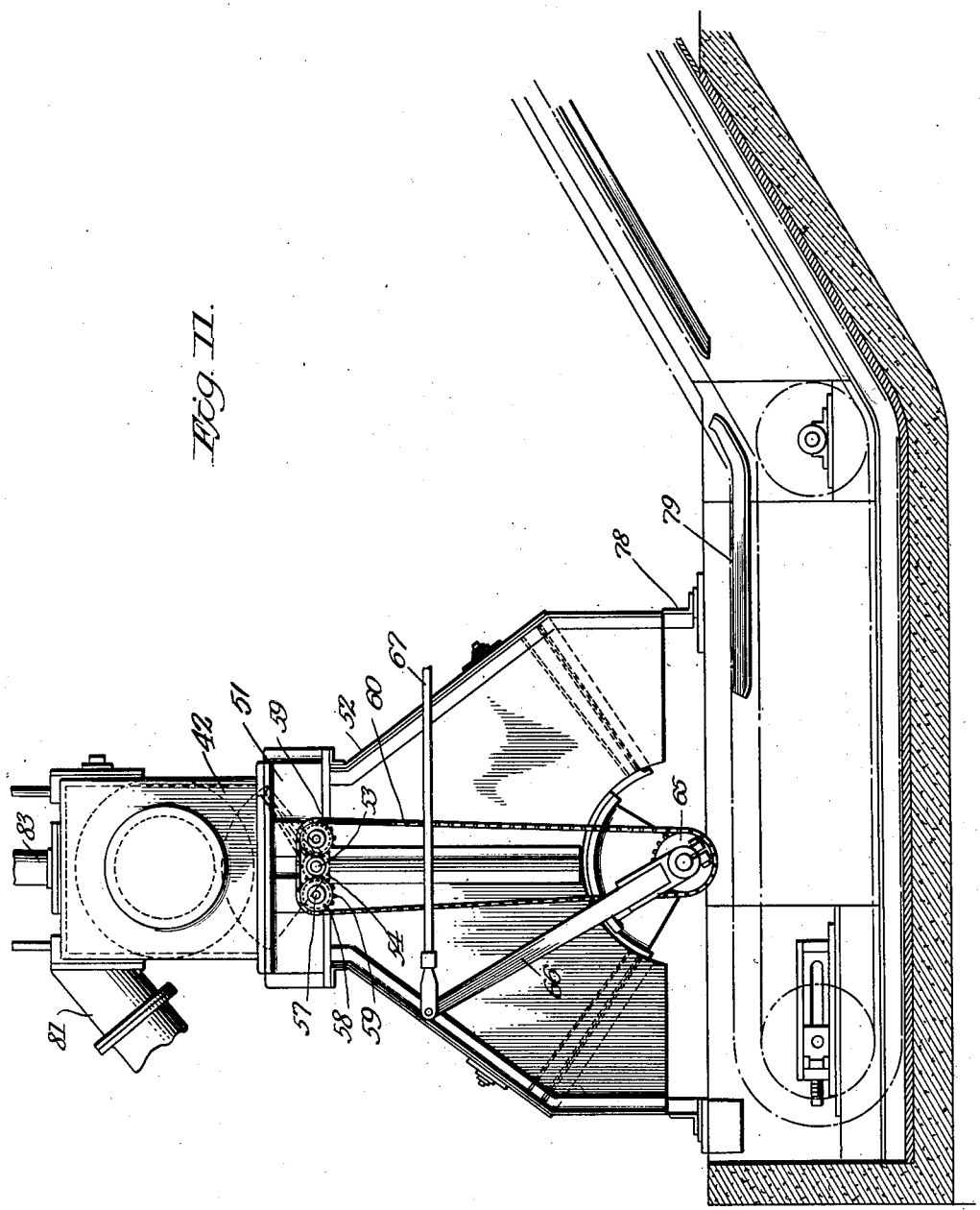

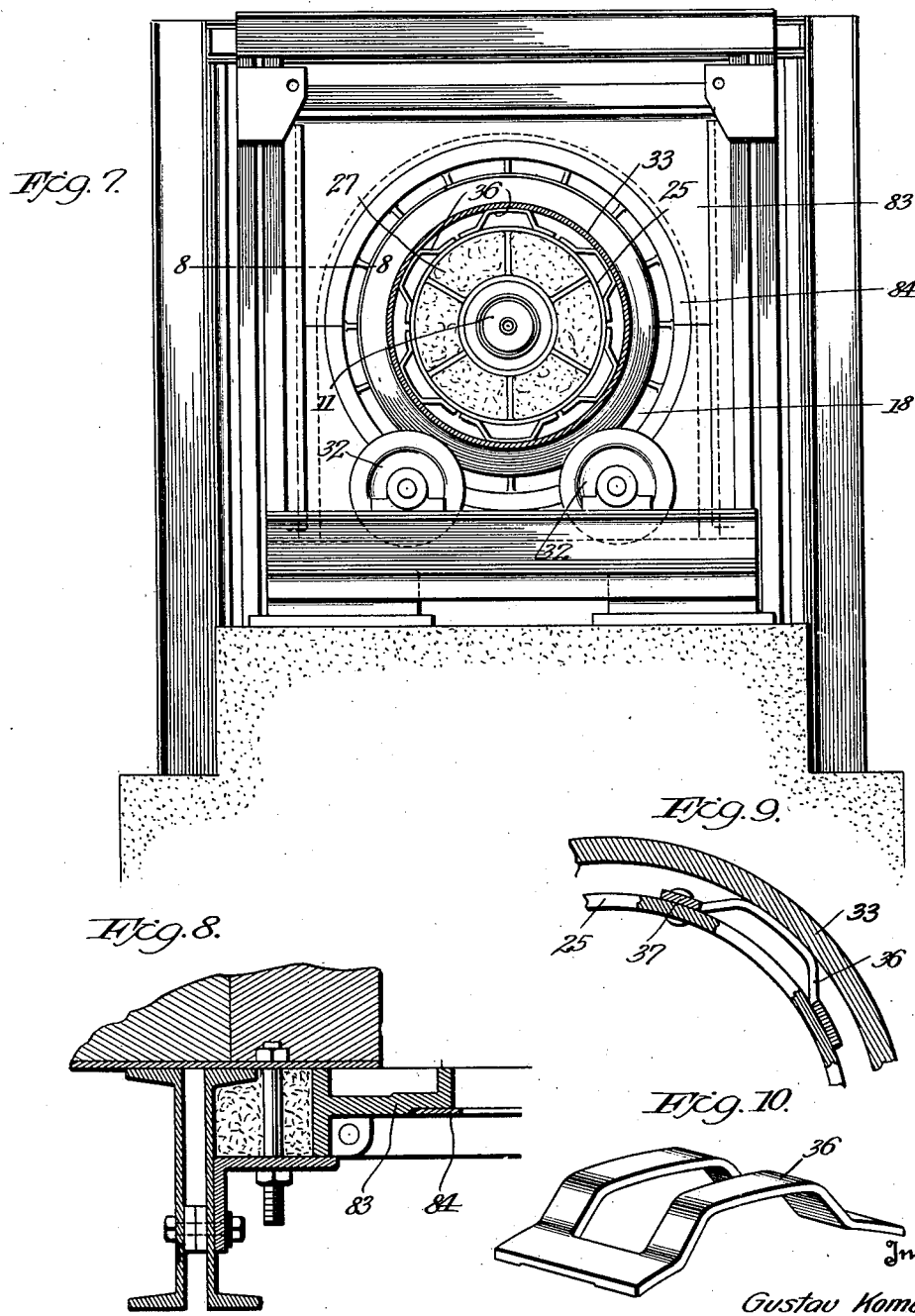

Feb. 13, 1934.　　　　G. KOMAREK　　　　1,946,628
PROCESS OF COKING COAL
Filed May 12, 1930　　14 Sheets-Sheet 8

Inventor
Gustav Komarek.

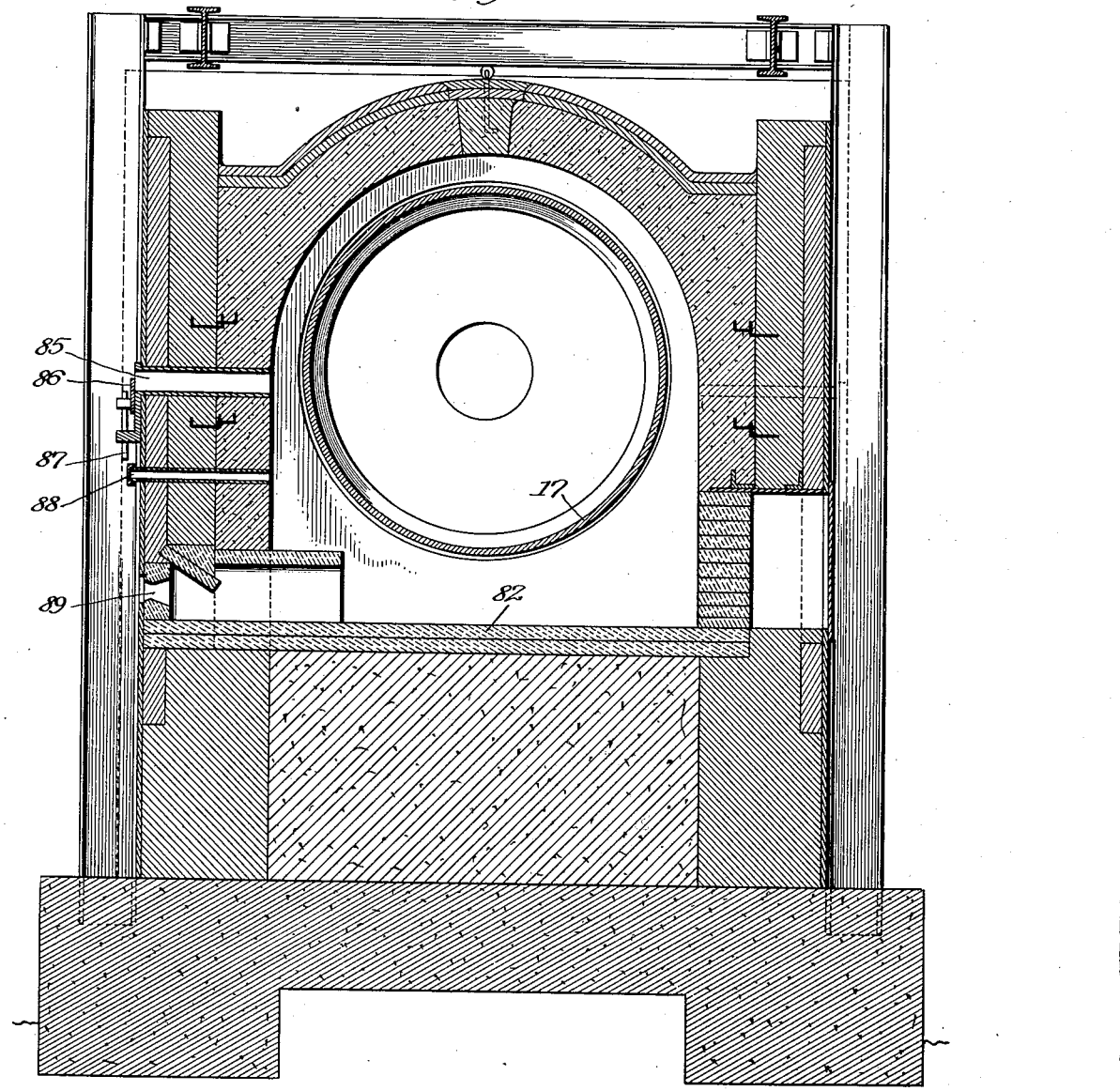

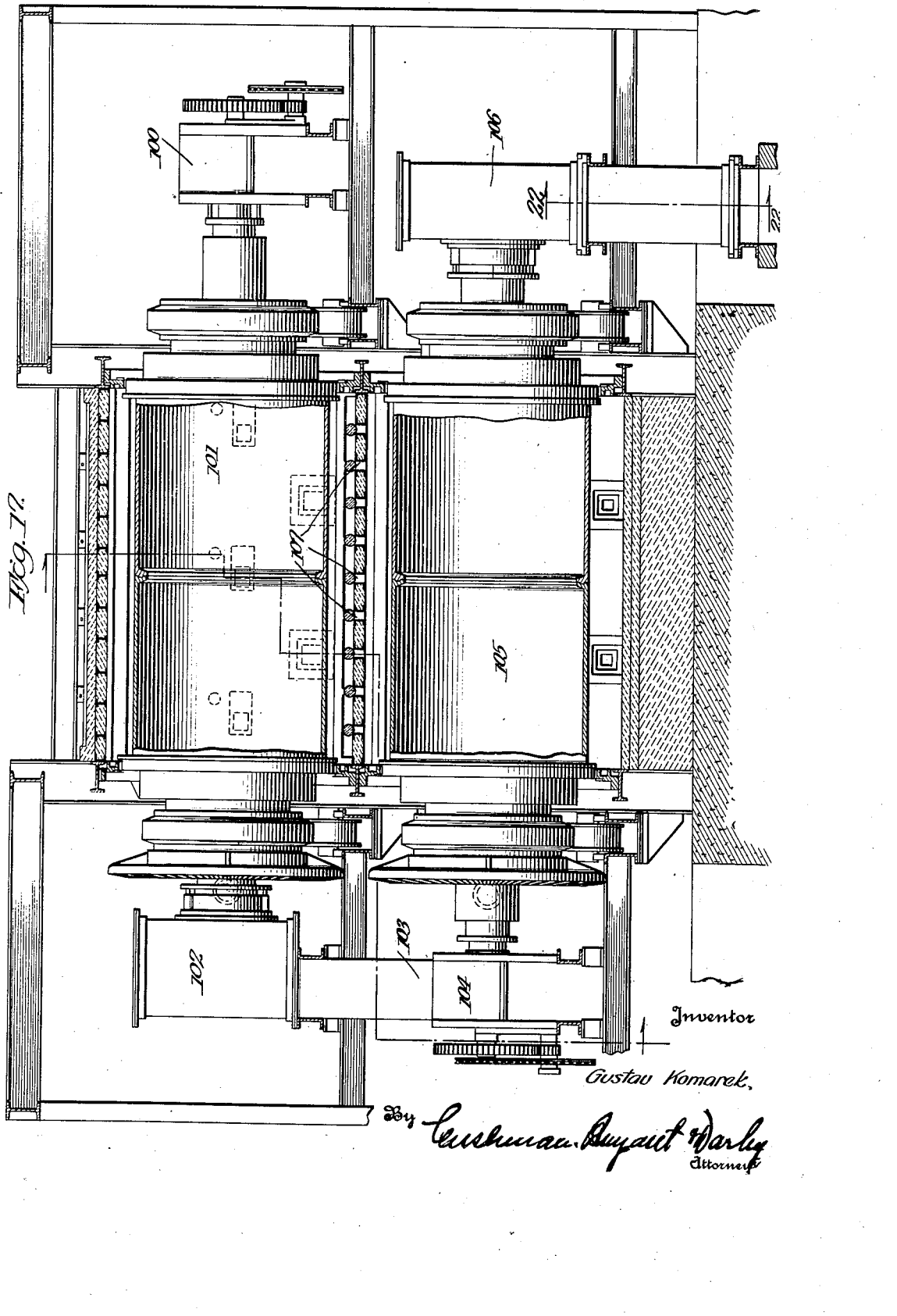

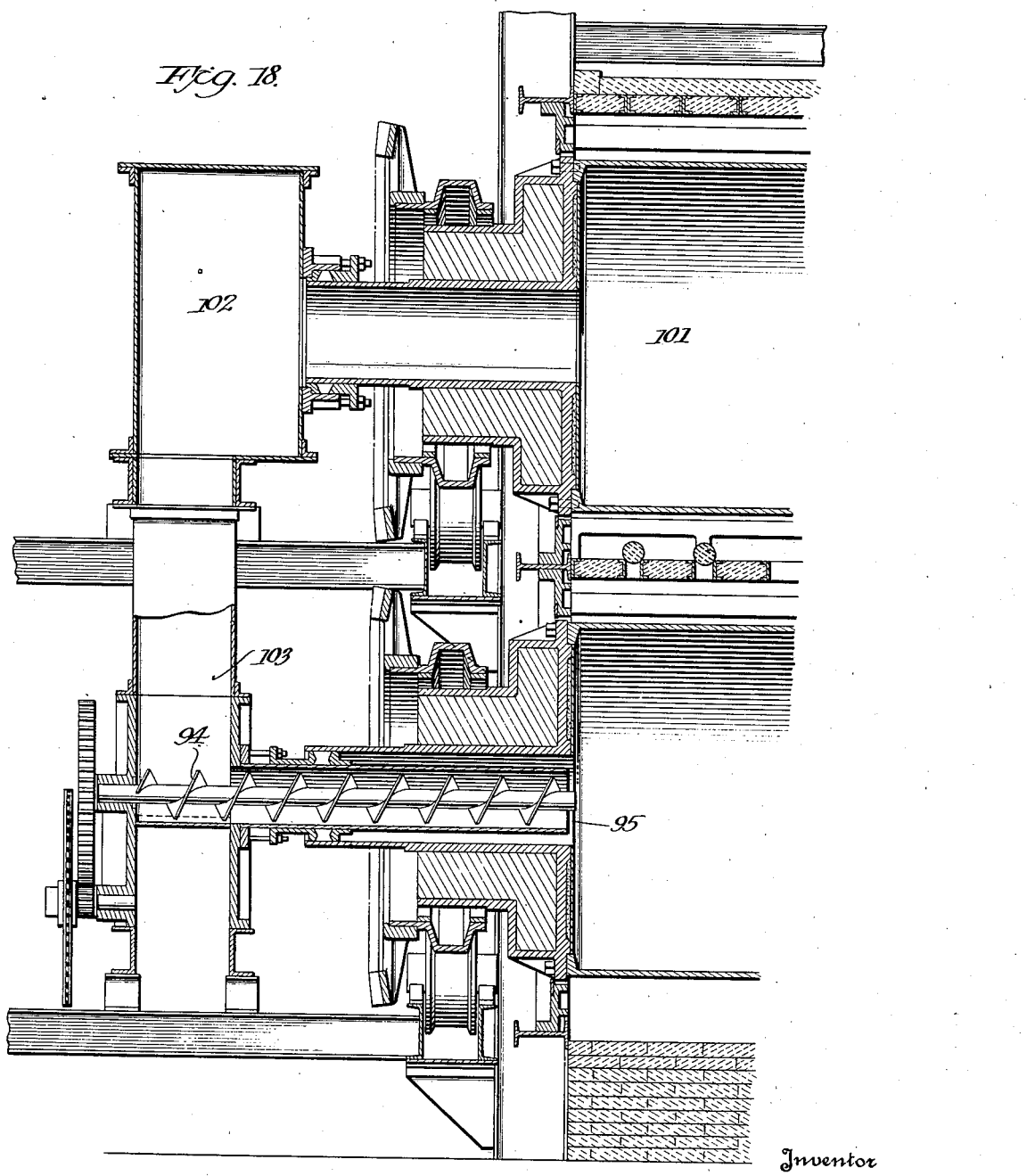

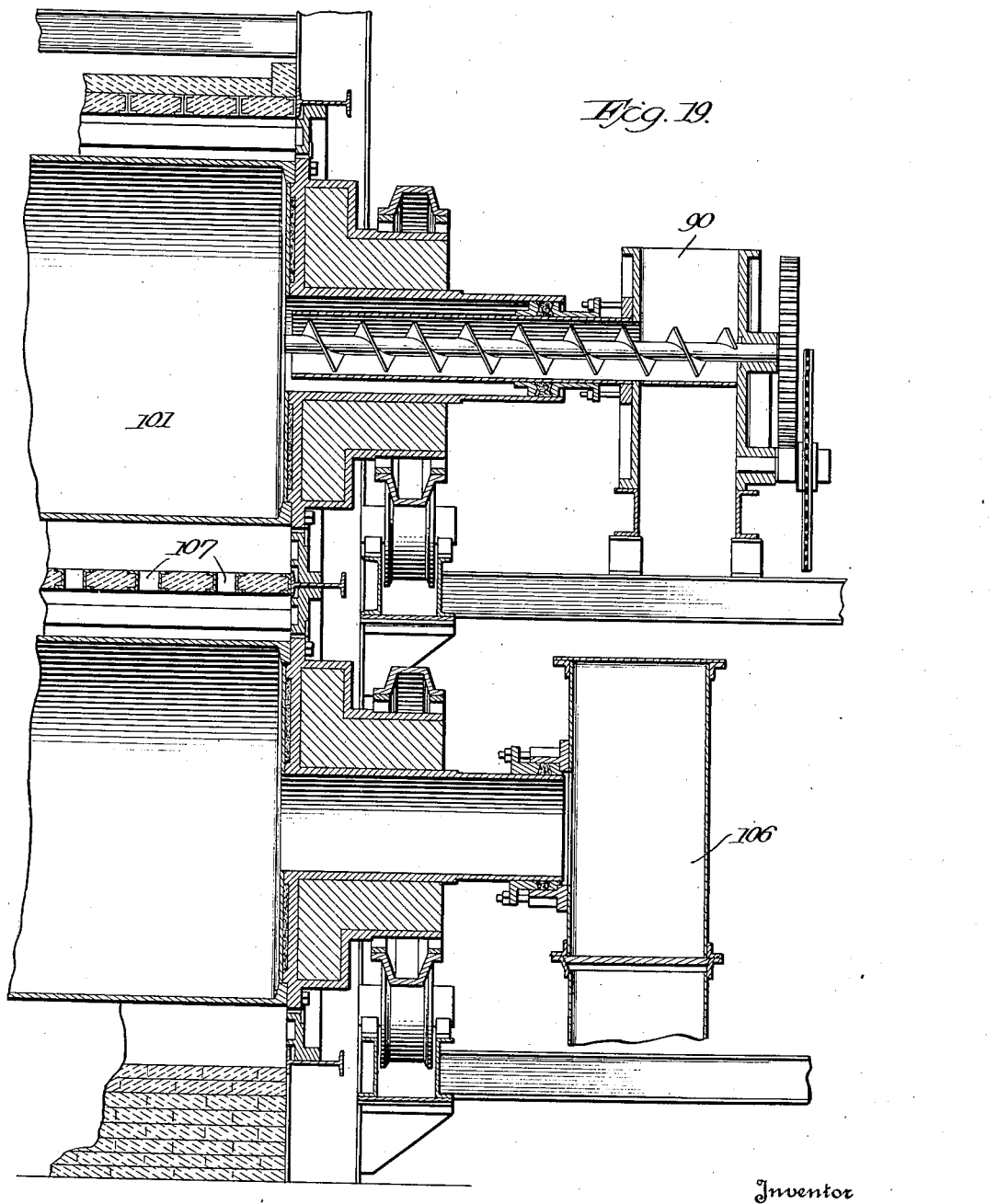

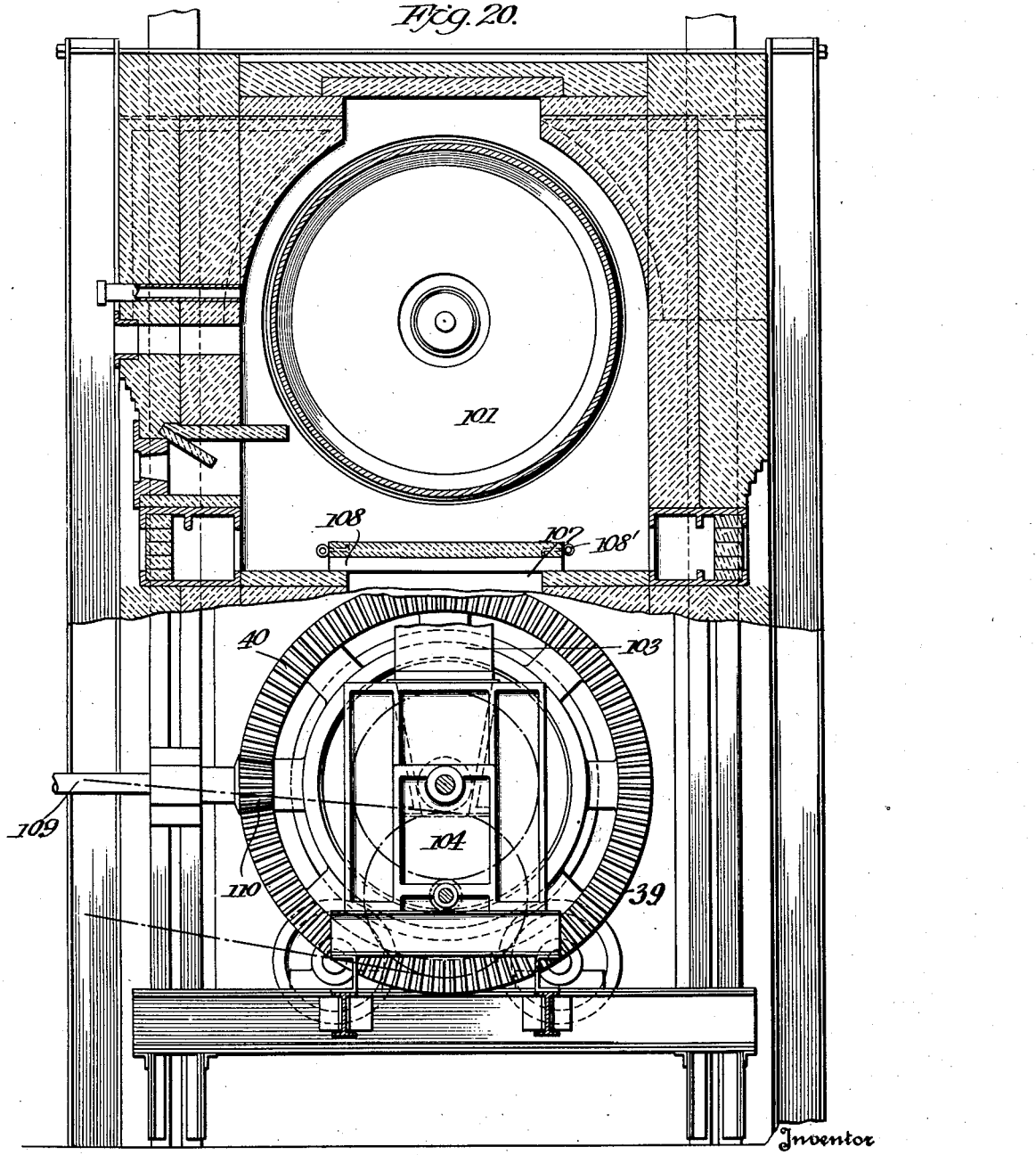

Feb. 13, 1934.  G. KOMAREK  1,946,628
PROCESS OF COKING COAL
Filed May 12, 1930   14 Sheets-Sheet 14
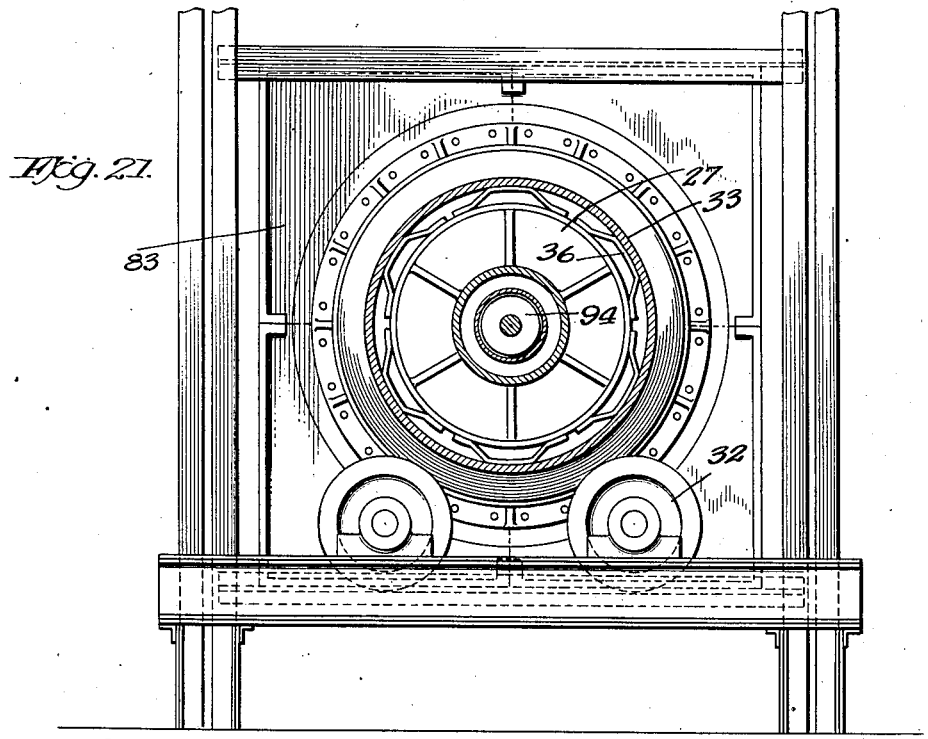
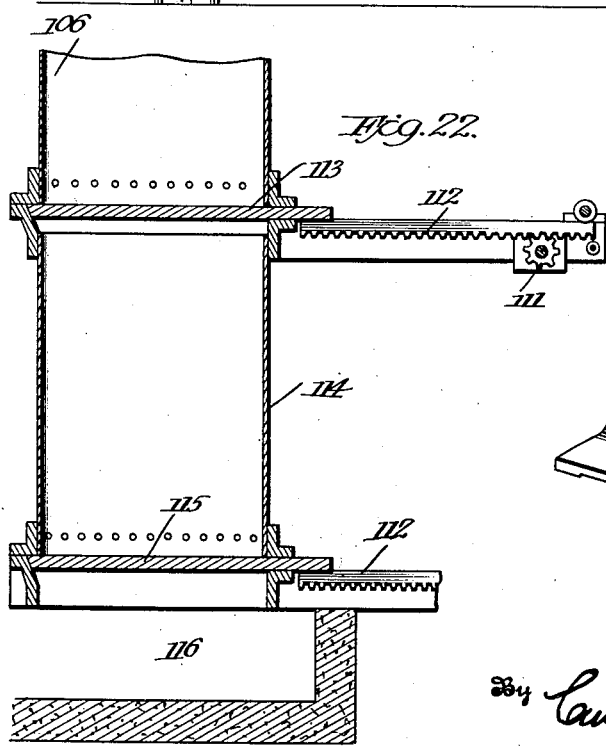
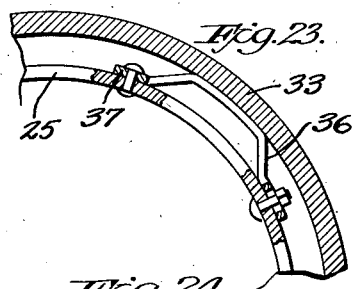
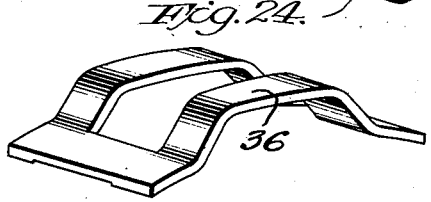
Inventor
Gustav Komarek
By Cushman, Sayant & Darby
Attorneys Patented Feb. 13, 1934

1,946,628

UNITED STATES PATENT OFFICE 1,946,628

PROCESS OF COKING COAL

Gustav Komarek, Chicago, Ill., assignor to Berwind Fuel Co. of Delaware, Chicago, Ill., a corporation of Delaware Application May 12, 1930. Serial No. 451,683

4 Claims. (Cl. 202—28)

This invention relates to the carbonization and distillation of hydrocarbons preferably in solid form and more particularly pulverulent bituminous coal.

The object of the invention is to subject such material to a continuous treatment whereby a maximum amount of by-products will be obtained as well as an optimum quantity of coke.

The invention seeks to accomplish the carbonization and distillation by a process which will not only be rapid, but will also be free from any complicated control features, to the end that a continuous process is evolved which is extremely efficient for large scale production.

With processes heretofore, it has been necessary to resort to inclined retorts or kilns of considerable length and there have also been processes wherein the application of heat has taken place in accordance with a rather delicate system of zoning with relation to exothermic reactions.

The economic process is one which will permit the efficient treatment of the largest possible quantity of coal in the shortest period of time and with the smallest expenditure of fuel for heating.

With this in mind, the present invention contemplates the use of a retort in which the diameter or width is considerably greater with relation to the longitudinal dimensions of the retort than has heretofore ever been attempted. With a retort having a large transverse dimension, and a relatively short longitudinal dimension, the feeding and discharge tubes are disposed axially and are made of considerably less diameter than the diameter of the retort. In this manner the fuel will be fed into the retort and a definite fixed level will prevail comparable to the diameter or width of the retort and the consequent position of the centrally disposed inlet and outlet passages.

Therefore, the quantity of coal in the retort will always be maintained a constant and the discharge will be controlled by the extent of the feed and the speed of movement of the retort. Combined with such a structure is a heating means and since there will always be present a normal amount of coal equal to substantially one half of the cubical content of the retort, the temperature gradient will be maintained a constant.

Aside from these advantageous features, the use of a retort having a relatively large transverse dimension will assist in the production of a coke product having a density only slightly less than that of the original coal and which will be formed in lumps having a hard crust-like exterior. The coke, being of high density, will have a minimum number of cells therein.

It will be possible in accordance with my process and apparatus to regulate the size of the lumps and moreover the degree to which they are coked.

A further advantage of the present invention resides in the use of a retort of large transverse dimension, in that a great mass of material will be accommodated. The coal first reaches a state of plasticity or semi-plasticity and heretofore has tended to cling to a retort shell. With the present invention, the great pressure exerted by the coal itself due to its depth in the retort causes the portion of the mass adjacent the shell to assume a hard crust-like form. At the same time, the oily vapors produced, because of the depth and density of the mass, find an easier path out of the material, between the mass and the shell, and in this manner form a gaseous layer which prevents the objectionable sticking of the plastic material to the shell.

The fixed depth of coal within the shell causes a pressure to be exerted upon the lowermost portions of the mass and hence the compression caused by this weight will result in densifying the mass as well as increasing the specific gravity of the final product.

In carrying out the invention, reference will be had to the accompanying drawings wherein:

Figure 1 is a side elevation.

Figure 2 is a side view in section of the inlet.

Figure 3 is a side view in section of the outlet.

Figure 4 is a view partly in section showing the receiving means for the coke product.

Figures 5 and 6 are details of the construction shown in Figure 4.

Figure 7 is an end view.

Figure 8 is a detail horizontal sectional view on the line 8—8 of Figure 7.

Figure 9 is a detail view, partly in vertical section, of the supporting structure shown in Figure 7.

Figure 10 is a detail perspective view of one of the supporting elements illustrated in Figures 7 and 9.

Figure 11 is an end elevation, partly in vertical section, of the structure used for carrying out my process.

Figure 16 is an end view in section showing the retort and the associated furnace structure.

Figure 17 is a side view of a modification partly in plan and partly in section.

Figure 18 is a side view of one end of such modification in section.

Figure 19 is a side view in section at the opposite end of such modification.

Figure 20 is an end view, partly in vertical section, of the modification.

Figure 21 is a vertical sectional view through the infeed end of the upper retort shown in Figure 17.

Figure 22 is a vertical sectional view on the line 22—22 of Figure 17.

Figures 23 and 24 are views in the modified form of apparatus, these views being similar to Figures 9 and 10, respectively.

Figure 12:
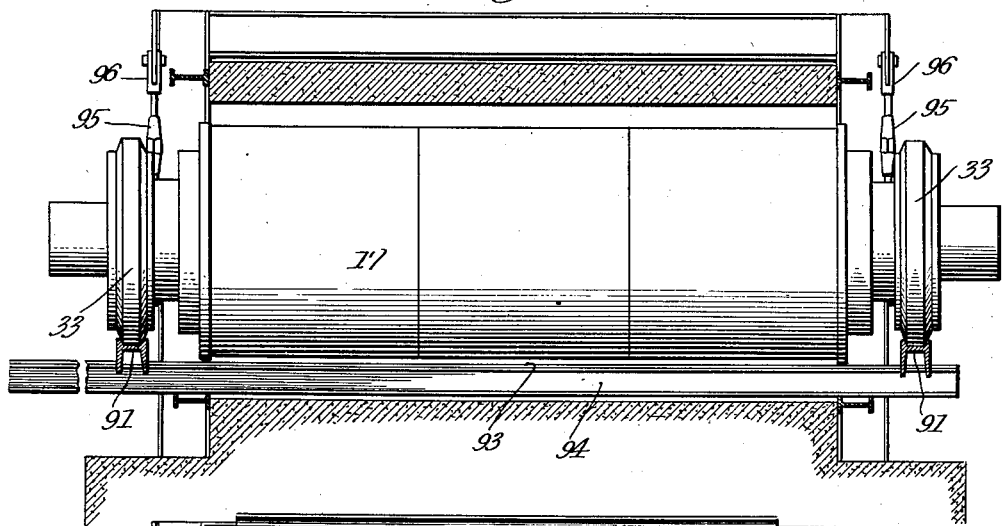
Figure 12 is a side elevation of the retort.

Referring to Figures 1 and 2 of the drawings, the pulverulent mass of coal, preferably bituminous coal, is fed into a fixed hopper 10 which is mounted upon a suitable support, preferably adjustable, and disposed at the feed end of the retort.

The coal deposited in the said hopper is acted upon by a spiral conveyor 11 which, as shown, works in the bottom of the hopper.

The conveyor shaft has keyed to it, at one end, a hub 12 which is rotatably mounted in a bushing 13 carried in one wall of the hopper. Rotatably associated with the hub is a gear wheel 14 meshing with a gear 15 actuated by any suitable mechanism.

The conveyor 11 for the greater portion of its length, is disposed in a tubular member 16 having one end supported by the hopper and communicating therewith and its outer end opening into the retort.

The retort end of the tubular member carrying the conveyor will preferably terminate just short of entering the body of the retort, as illustrated in Figure 2.

The retort is indicated as a whole at 17 and is formed of metal sections of cylindrical form capable of withstanding a great weight and pressure as well as the necessary temperatures for distillation and carbonization.

The retort is characterized by having a much larger transverse or diametrical dimension in relation to its longitudinal dimension than is common with ordinary kilns or retorts for this and other purposes.

A retort of the same length as its diameter will perform satisfactorily the purposes as set forth in this application, however, conditions will be encountered where greater length than diameter will be desirable, for instance, wet coal and certain conditions that may for economic reasons make it undesirable to dry such coal. A range of from same length as diameter of retort to three times the diameter in length will cover all conditions that may have to be met. For instance, a retort ten feet in diameter and ten feet long (both dimensions apply to inside diameter and length of the actual carbonizing chamber) would perform satisfactorily, but in order to meet certain conditions, a retort ten feet in diameter and thirty feet long would provide sufficient range to meet varying conditions.

The retort is closed at the inlet end by a plate or head 18 which is suitably secured by bolting, welding, or otherwise to completely seal that end in a gas tight manner. A central opening 19 defined by an axial extension 20 receives the conveyor 11 and the feed tube 16.

Disposed within one end of the extension 20 and adapted to enclose and support the tube 16 is a suitable packing means comprising split rings, or one piece packing glands 21 and 22. Between these rings is disposed a flexible packing material indicated at 23. The split ring 22, it will be noted, is in the form of a cylinder and has suitable extensions by which it is adjustably connected through the medium of the bolts and nuts 24 to the wall of the hopper 10. In this manner the packing is capable of effecting a close sealing relation between the tube 16 and the extension 20. At this point it should be stated, of course, that when the retort is rotating, the extension 20 will rotate about the packing and the tube 16.

The head 18 may be circular as desired, and adjacent its edge there is formed a lateral extension 25 of stepped formation. This extension 25 is of less longitudinal dimension than the extension 20 as shown in Figure 2. The steps are indicated at 26 and 26', 26 being the longer step. There is defined between the extensions 20 and 25, a space which is packed with any suitable heat insulating medium 27, this being desirable in order to retain all of the heat within the retort.

In the construction shown, a space or clearance is defined between the tube 16 and the extension 20 interiorly thereof so that coal being fed through the tube by the conveyor, may be given a preliminary heating through the medium of gases from the retort. It will be possible, then, by increasing or diminishing the cubical area of such space as well as its longitudinal extent to subject the coal to a greater or less initial heating.

The head 18 is provided with an interior flange 28 preferably circular, which closely fits in an air-tight manner the internal flange 29 of the retort. A suitable recess is formed in the face of the plate or closure and within this recess is disposed a layer of heat insulating and fire-proof material 30. Disposed over this material is a suitable metallic washer 31 having an opening aligning with the opening in the retort and extension 20. This washer also assists in maintaining an air-tight joint between the plate and the retort.

The retort is rotatably supported at its ends upon suitable fixed casters or rollers 32. These rollers are mounted upon brackets which are supported preferably upon the base of the furnace. A pair of the rollers is disposed under the longer steps 26 of the extensions 25, and adjacent the end thereof, are tires in the form of cylindrical members 33. These tires are provided at their base with oppositely disposed flanges 34, one of which is relatively elongated. It will be seen that the tires are adapted to engage the rollers between the flanges 35 thereon and to be supported by said rollers for rotation. The tires are of greater internal diameter than the diameter of the extensions 26 and within the space defined thereby are disposed the supporting and connecting means 36 for the tires with respect to the step 26 of the extension 25. This supporting and connecting means as illustrated in detail in Figure 10 shows a plurality of the members 36 as shown in Figure 7 which are circularly disposed about the extension 25 and connected at one end thereto as shown at 37. The members 36 are formed from a strip of metal which may have varying degrees of thickness and flexibility and will preferably be cut out or slotted intermediate its area and bent as shown so as to form a flexible cushion. The purpose of these members is to allow for contraction and expansion due to the heating and cooling of the parts.

The upwardly bowed portions of the respective members, it will be noted, will engage the underside of the flanges 34 to flexibly and frictionally support the tires 33 in position, as shown in Figure 7.

One of the flanges 34 is elongated as described previously and shown at 38, and carries a gear 39 which may be keyed thereto in any suitable manner. The teeth 40 of the gear 39 may be meshed with a second gear and actuated in any desired manner.

At this point it may be stated that the operation of the gears 14 and 39 may be controlled so that the speed of rotation of the retort may be timed in accordance with the speed of the conveyor or vice versa. It is desirable in employing the apparatus and the process of the invention to employ a definite ratio of rotation between the retort and the feeding means, and any suitable gearing may be utilized to effect this purpose.

The opposite end of the retort is provided with a construction identical to that described in connection with the inlet shown in Figure 2 with the exception of certain details connected with the discharge of the final product which will now be described.

The head 18 at the discharge end and its associated parts are all similar to those already described in the inlet or feed end of the retort and it will be seen that an axially disposed outlet or discharge extension 41 is integrally connected with the cap plate 18. This discharge passage communicates with a casing or chamber 42. The chamber 42 may be of various dimensions and its detail construction will be later described. As shown in Figure 3, the discharge 41 extends into the adjacent wall of the chamber 42 and a suitable gas-tight packing is associated with these parts. This packing comprises the split ring 43 and the split ring 44 between which is disposed a flexible packing 45 which surrounds and bears upon the outlet 41. Bearing upon the packing just described is a second split ring 46 having a flange 47 engaging the adjacent vertical wall of the chamber 42. The ring 46 is grooved to receive a preferably split packing ring 48 which bears against one side of the flange 47, as shown. The ring 48 is carried by bolts 49 which are threaded into the wall of the casing 42 and on one side carry springs 50 whereby a tightening up of the nuts 49' carried by the bolts will result in a tight engagement of the packing with the adjacent wall of the casing about the outlet 41. Moreover, bolts 46' are adjustably engaged in an upstanding flange of the ring 43 and at one end engage the adjacent end of the ring 46 so that this member can be caused to tightly engage the wall of the chamber 42.

The casing or chamber 42 at its lower end receives a casting 51 forming a vertical extension of the casing. This casting 51, like the casing 42, is preferably rectangular and has two upstanding guide walls which fit within the lower portion of the casing 42. Intermediate its ends the casting 51 is provided with an external flange or flanges 51' upon which bears a flange or flanges 42' formed on the casing whereby the casing is supported upon the lower casting 51. The lower casting 51 is in turn supported as shown in Figure 4 upon a suitable receiving structure 52 for the final product which will be later described.

Journalled in the lower casting 51, at its lower end, is a shaft 53 carrying a gear 54 exteriorly of the casting and said shaft is integral with or otherwise rotatably associated with a gate 55 interiorly of the casting as shown in Figures 3 and 4. The shaft 53 is carried in suitable bearings in the lower end of the casting 51 and a packing is provided as will be readily understood. At this point it should be stated that the gate 55 is of a dimension to closely fit the walls of the casting 51 and acts as a valve.

Also, as shown in Fig. 11, journalled in the lower end of the casting 51 are a plurality of shafts 57, disposed upon opposite sides of the shaft 53. Each shaft 57 carries a gear 58 which meshes with the gear 54 and also a sprocket gear 59 receiving a sprocket chain 60.

Referring to Figure 4, it will be observed that the gate 55 will selectively control the passage of material discharged into the chamber 42 into one or the other of a plurality of storage chambers 61 in the receiving structure 52. The chambers 61 are separated by a divider plate 62 and the lower end of each chamber 61 is selectively closed by a valve or gate 63. This latter valve 63 is mounted upon a shaft 64 which is journalled in bearings formed in the depending arms 64', so that the valve may swing to close the bottom of one or the other of the chambers. A sprocket 65 is mounted on the shaft 64 over which passes the chain 60 and keyed to the shaft 64 is a lever 66 to which is connected an operating rod 67.

Movement of the operating rod 67 will move the gate 55 to close the receiving end of one bin and the gate 63 to open the discharge end of the said bin, at the same time opening the receiving end of the other bin and closing its discharge end. This operation of the rod 67 may be made automatic at a definite period, or depending upon the weight of material in the respective bin bearing upon the gate 63, or other means.

It will be noted from Figures 3 and 4 that the gate 55 moves flush with the upwardly extending walls of the lower casting and is enlarged as shown at 68 to engage the bevelled edges 69 of the other side walls so as to form a tight closure. The gate 55 is pivotally mounted at the upper end of the divider plate 62 as shown in Figure 6, the divider plate being provided with oppositely disposed plates 70 forming a pocket containing a suitable packing 71 which is engaged by the lower end of the gate as shown in Figure 6. Thus, the bins are sealed from each other at their upper ends by the divider plate 62 and also from the casing 42 when one or the other of the entrance ends of the bins are closed.

The bins are preferably formed of sheet metal and are defined by the divider plate 62 and the inclined outer walls 72, the side walls being, of course, vertical. The bottoms of the bins are preferably inclined as shown, and there is provided a double wall construction indicated at 73 with the walls spaced apart. Secured to the opposite sides of the bins is an arcuate trough indicated at 74 which is riveted to the walls as shown in Figures 4 and 5, and which is provided with flanges at its ends indicated at 75, which flanges fit in the space between the bottom walls 73 as shown. The trough has positioned intermediate its ends a division 76, as shown in Figure 4, which receives and is secured to the lower end of the divider plate 62. In this manner, material passing from either of the bins 61 when the gate 63 is open, will pass through the adjacent opening in the trough on one side or the other of the division member 76.

In this connection, the arms 64' carrying the gate 63 and its shaft 64 are riveted or otherwise secured to the trough at a point substantially intermediate its ends as indicated at 77, or may be integral with the trough.

The gate 63 is segmental and its periphery being arcuate is adapted to conform closely to the arcuate contour of the bottom edges of the trough 74 as well as the bottom edges of the flange portion 75 of the trough. In this manner the gate will effectively seal the bottom of either of the chambers 61 as the case may be.

The bins 61 are preferably formed of sheet metal riveted or bolted together to form the enclosed structure and are supported by brackets 78 disposed upon the base of the furnace and, of course, below the level of the furnace bed, as shown best in Figure 1.

The material discharged from either bin 61 by the opening of the gate 63 is deposited upon a suitable endless conveyor 79 and carried to the point of distribution.

The chamber 42 is likewise preferably formed of sheet metal and in its top is provided with an outlet pipe 79 for volatile distillation products which pass from the passage 41 to the chamber 42 as well as for any volatile products which are formed while the coke is in either of the bins 61.

An opening 80 for allowing access to the chamber where necessary is provided and closed by a suitable door or plate 81. Referring to Figure 1, the furnace is provided with the usual base upon which is disposed a layer or layers of fire brick 82. The furnace is formed of refractory material and is secured together in any suitable manner as by metallic fabricated products as is well understood.

Figure 15:
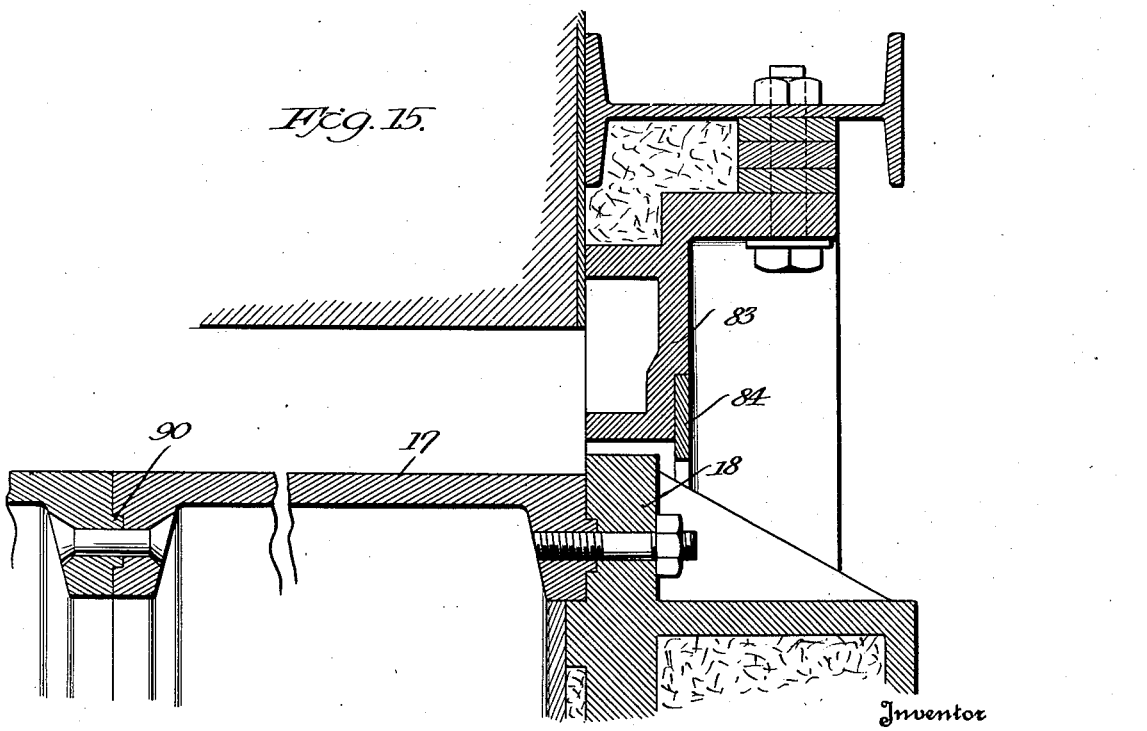
Figure 15 is a detail view of the construction at the end of the retort and the adjacent furnace.

At the ends of the furnace there is secured to the adjacent I-beams a plate which is preferably square and indicated at 83. This plate as shown in Figures 2 and 3 has an opening and fits about the peripheral edge of the plate 18 with its adjacent edge spaced therefrom. This plate is adapted to cover the space defined by the retort and the adjacent wall of the furnace and by reason of the space between the edge of the plate 18 and the edge of the plate 83 closing the end of the furnace, clearance is allowed, as shown in Figure 15, for expansion and contraction which will occur in a construction of this character. A suitable metal plate 84 in the form of a ring is attached to the plate 83 and acts to confine or limit any escape of flue gases which might occur in the space between the respective closure plates.

Referring to Figure 16, there is provided in the furnace walls, a number of vent openings indicated at 85 adapted to be closed by a plurality of sliding doors 86 operated by a sliding lever 87. The numeral 88 indicates a sight opening and the numeral 89 indicates one of the openings through which an oil or gas burner is extended.

Figure 14:
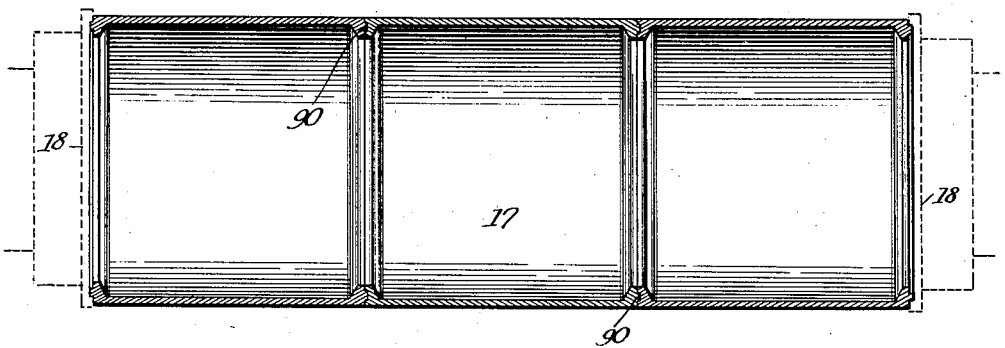
Figure 14 shows a retort of three sections, the view being in vertical section.

The retort proper is illustrated in Figure 14 and is comprised of a plurality of cylindrical sections which are bolted or otherwise joined at their ends and for this purpose are provided with inwardly directed flanges or ribs respectively having a tongue and groove 90, whereby a firm and thoroughly strong joint is provided.

These internal ribs have several advantages, viz: they permit the retort to be built up in section as it would be too expensive to make such a retort in a one piece casting. If ribs were on the outer diameter the heat would attack them and they would soon deteriorate to such an extent as would threaten failure of the retort. The internal ribs are protected against too high a temperature because the coal inside of the retort is always at lower temperature than the retort shell; therefore, the inwardly projecting ribs will conduct the excess temperature to the coal and at the same time are subject to a constant cooling action by coming in contact with the coal which is at a lower temperature. The inside of retort is neutral and therefore cannot attack the metal. This is of great importance as the strength of the joints is of vital importance and the factors mentioned make it possible to maintain these joints unimpaired during the life of the retort.

Figure 13:
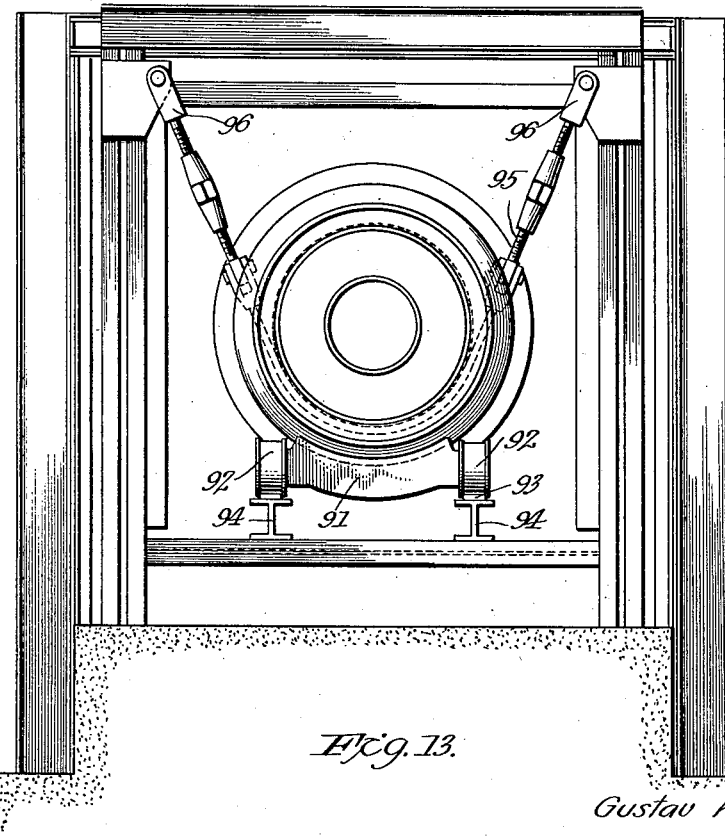
Figure 13 is an end elevation, both views indicating how the retort is disposed in position in the furnace.

Referring to Figures 12 and 13, after the furnace has been prepared to receive the retort, the retort is arranged upon cradles 91 mounted on wheels or rollers 92 which move upon tracks 93 carried by I-beams 94 whereby the retort may be moved into the furnace. Thereafter, suitable tie rods 95 are passed about the retort and secured at their ends to the metal beams at the respective ends of the furnace as indicated at 96. In this manner the retort will be supported and can be so adjusted as to lie properly within the furnace and in horizontal position therein. The cradles and I-beams are then removed from beneath the retort and the rollers 32 are positioned with proper adjustment to receive the tires 33 and support the retort operatively for production. Thereafter the tie rods 95 are removed.

It will thus be seen that material will be deposited in the hopper 10 and discharged through the tube 16 into the retort. The retort will be rotated and the material will be progressively destilled and carbonized, and in the form of coke lumps of spherical shape will be passed through the discharge 41 into the chamber 42 and drop or collect in either of the bins or chambers 61.

Throughout the process, the apparatus provides for the complete exclusion of air and by having a retort of relatively large cross-sectional dimension with centrally disposed inlet and outlet passages of considerably less diameter, it will be seen that a definite level of coal and coke products must be reached in the retort before the coke products will pass out of the discharge 41. This will be understood, since the retort is maintained in horizontal position as distinguished from prior efforts where long inclined treating members have been utilized.

In other words, the coal and coke products will at all times occupy substantially one-half of the cubical area of the retort and the rate of discharge will depend primarily upon the rate of movement of the feed conveyor 11 and the speed of rotation of the retort 17.

By having the bins in communication with the chamber 42 and its flue 79, any volatile products, or the products of any exothermic reactions taking place in the bins in which the treated coke is stored preliminarily will be carried off and hence entrained gases will be eliminated from the final product so far as possible. The coke as delivered will be free of any objectionable tar odor which is so noticeable with previous methods when the coke is presented to the atmosphere.

Heretofore it has only been possible to treat coal containing a considerable amount of bitumen and on which the surfaces exhibit a gummy or resinous condition by submitting the coal to an oxidizing treatment. With the present process, however, the gummy or resinous surfaces on the coal are a much desired property and contribute toward producing the density and high specific gravity of the lump product as discharged from the retort.

In some cases where the coals are too low in bitumen and volatile content to develop the desired state of plasticity or semi-plasticity, good results are obtained by adding coal tar pitch to the coal. The coal tar pitch is preferably added in liquid form and is supplied to the retort preferably at a point adjacent the feed end of the retort or at that point where the coal under treatment has reached a semi-plastic state.

In some cases, however, the coal tar pitch may be mixed with the coal prior to its admission to the hopper or while it is in the hopper and being conveyed by the screw 11.

In Figure 1, I have illustrated a pipe 97 which extends through the conveyor shaft and is adapted to discharge into the adjacent end of the retort at 98. This pipe, however, may be carried further into the retort, and the liquid sprayed by any suitable means. Where it is desired to mix the coal tar pitch with the coal while in the hopper 10 and tube 16, the conveyor shaft will be suitably perforated to afford this result.

In Figures 17 to 24 inclusive, is illustrated a modification of the invention which, however, is characterized primarily by the provision of its superposed retorts and a slightly different feeding and discharge means.

The retorts proper and their associated operating mechanism are all similar to that previously described.

Referring to Figure 17, the coal is fed into the hopper 100 and discharged into the retort 101 which is preferably maintained at a temperature below 600° F. where it is preliminarily treated and thereafter discharged into the hopper 102 from whence it vertically drops through the enclosed chute 103 into a hopper 104. From the hopper 104 the preliminarily treated coal is passed into the lower retort 105 and discharged into the chamber 106 in the form of suitable coke lumps.

The respective retorts may be individually heated and if desired the upper retort may be heated by means of the lower furnace in which event the openings 107 in the floor of the upper furnace will be uncovered by means of gates 108 shown in Figure 20. The gates are in the form of bars and are provided with eye members 108' whereby they may be adjusted independently or together by a suitable operating means such as levers engaging the eyes and extending externally of the furnace. This will allow all of the heat generated in the lower furnace to be confined therein when the gates are closed while, if it is desired, said gates may be opened as described to assist or entirely heat the upper retort.

In Figure 20 is disclosed one means of operating the gear 39, namely a shaft 109 connected with any suitable source of power carrying a pinion gear 110 at its end engaging the gear 39. It will be understood in this construction that both of the retorts are rotated and they may be rotated in timed relation or at different speeds. Also, the feeding means, as in the previous case, may be regulated in accordance with the speed of rotation of the respective retorts, both retorts being in horizontal position.

The discharging means disclosed in this modification comprise a chamber 106 into which the coke from the retort 105 is passed. The coke is permitted to cool in this chamber until exothermic action has substantially stopped whereupon the gear 111 (Figure 22) is operated engaging the rack 112 to which is connected the gate 113 whereby the feed valve will be opened to permit the material to fall into the chamber 114 which is in open communication with the chamber 106 when the gate is open. The chamber 114 is provided at its lower end with a similar gate 115 which is operated in a similar manner by means of the rack and pinion and by the mechanism employed, when the gate 113 is open the gate 115 is closed so that one or the other of said gates will at all times be in closed position to confine the material discharged by the retort. When the gate 115 is opened, the material stored in chamber 114 will be delivered into a suitable receptacle or conveyor disposed below the furnace base, in the space indicated at 116.

Having described the apparatus and its operation, the process forming a part of the present invention will now be fully set forth.

As will be understood, the invention seeks to produce low volatile smokeless lump coke of substantially spherical shape and of convenient size for use in stoves, furnaces and other purposes. The coke lumps are unique in that they are free burning, long flaming and are made up of small pieces or particles conglomerated into a hard solid form of rounded contour possessing a high specific gravity and of sufficient strength to permit handling and transportation without producing objectionable dust or fines.

The products are further characterized by possessing a density, and as stated, a high specific gravity considerably above that of the usual coke products and not substantially less than the weight of the original coal.

Generally stated, the particular coal which is usually bituminous and possessing varying degrees of volatile constituents and chemical compounds will be fed to the hopper 10. The coal may be initially mixed with a bitumen such as coal tar pitch if it be deficient in gummy constituent, or this material may be subsequently added to the mass when it is in semi-plastic state within the retort as heretofore set forth.

The coal may be preheated before it enters the retort either in a separate means as disclosed in the modified form of the invention, or preheated by its travel through the tube 16 as heretofore described. Preheating of the coal before it enters the retort is sometimes desirable and where high moisture content is present, as would be the case with washed coal, it is usually necessary to preheat in order to secure large throughput.

Upon reference to the apparatus disclosed in the drawings, it will be seen that preheating in accordance with this process is carried out with exclusion of air. In some cases preheating will not be necessary, as where the moisture content of the coal is low and in other cases a mere warming will be sufficient.

The coal is passed into the retort which is rotated at a sufficient speed to pass the material toward the discharge end in accordance with the feed from the conveyor and a definite level will be built up which is substantially one-half of the cubical area of the retort. When the level reaches a point above the bottom of the discharge 41, the coke lumps will pass from the retort into the chamber 42.

The temperature factor of the retort, wherein the distillation and carbonization takes place, will preferably be maintained constant throughout the area of the retort, but if desired zoning may be resorted to and various portions of the longitudinal dimension of the retort shell subjected to varying degrees of temperature. Zoning, however, is neither contemplated or necessary with this invention.

In carrying out this invention, a uniform temperature from 900° F. to 950° F. is applied the full length of the retort. This temperature, of course, will vary in accordance with the nature of the fuel and the speed of rotation of the retort and the feeding means. A constant temperature, of course, is desirable to eliminate the complicated control methods at present in use and is possible because a great quantity of coal is under treatment and the heat conducted through the retort shell is diffused throughout the bulky mass which is constantly in motion, and this obviates the necessity of any localized temperature application such as zoning. This method is possible also because of the relationship of the diameter of the retort to its longitudinal dimension and because a definite level or batch of material under treatment is maintained a constant throughout the process. Thus, the present method and construction are advantageous in that the so-called heat zoning method and accompanying complicated apparatus are unnecessary. Furthermore, it is possible to control the density of the resultant coke lumps. At the same time it is possible to flow the mass through the retort under absolute control in the same manner as a liquid could be regulated, and maintain at all times a fixed ratio of coal and coke to the cubical content of the retort.

In addition to these features and of fundamental importance is the fact that it is possible to control the uniformity of the coke, because if a portion of the coal should for any reason advance toward the discharge end, ahead of the progressive order, it would be diffused in the mass and treatment would be accelerated in the same manner as would happen if the retort contained water. In other words, if the discharge temperature of the water by comparison was to be 212° F., it would be difficult for a quantity of water to pass out or be discharged at a temperature less than 212° F. This is due to the great quantity or bulk of water which would cause such intermixing as would make it impossible to maintain anything but a uniform discharge temperature. The action which takes place within the great mass of coal is substantially similar to that which would occur were a liquid medium utilized as in the above example.

Because of the construction of the retort, there is always present a large and heavy mass of coal, semi-plastic and plastic material, and coke or reaction products in various degrees of formation. Since the retort is constantly rolling, the weight of these masses would naturally exert a great pressure with the result that the final product is extremely dense and hard.

The coal in its passage through the retort will first reach a semi-plastic stage and as it is carried about by rotation of the retort due to volatilization, parts of the plastic mass will separate and roll down or over the inclined surface provided by the more plastic portion which is closer to the retort shell and is being carried upward. In this manner all portions of the mass will be given a thorough distillation and carbonization treatment in accordance with requirements and there will result, of course, a progressive removal of volatiles and moisture. The mass will be progressively fed from the inlet and toward the outlet end of the retort and because there is a considerable weight of material in the retort, the mass will be subjected at all points to a heavy pressure, the ultimate result of which is a coke product of greater density only slightly less than the density of the coal as fed to the retort.

Heretofore, there has been a tendency of the plastic mass to cling to the wall of the retort, which in the present instance is eliminated due to the large cubical area occupied by the coal and the pressure exerted thereby. Thus, when the mass in the shell is in direct proximity to the furnace, resultant volatilization will cause a gas cushion to form between the mass and the adjacent shell wall, since the gases will follow the most available path. In other words, the gases cannot pass up through the heavy mass, as easily as they will exude from the mass adjacent the retort wall. This, of course, is due, as stated, to the great pressure exerted by the large content of coal in the retort.

This gas or vapor cushion is the means of causing effective separation between the retort shell and the semi-plastic mass. There is an entrapment of the gas between the shell and the mass at all times, so that in its various conditions of plasticity, the mass will always separate or break off from the shell. In this manner clinging is eliminated.

The heat supplied to the retort will be a constant throughout the retort and, therefore, as the smaller parts separate from the plastic initial mass, as it is moved in the retort, they will be progressively treated in additional volatilization. However, the practical result can best be described by stating that the semi-plastic particles of various sizes as they break off from the mass collect upon themselves, by adhesion, smaller and more completely dried portions, so that in effect the final product consists of a semi-coke, the exterior of which is hard and crust-like and has embedded within it a large number of smaller particles or pieces which are likewise hard and crust-like, but which adhere to the more plastic interior.

Referring to a specific treatment, the comminuted coal, either in raw state, dried, or preheated as desired, is fed to the retort by means of the conveyor 11. This coal it will be noted, is immediately heated by coming in contact with the heated shell and by heat of convection. The feeding by means of the conveyor is continuous and, therefore, the coal advances at a uniform rate toward the discharge end, the speed being dependent upon the speed of rotation of the retort and that of the feed conveyor. When this advance has progressed a definite distance, the heat will have acted to change the coal to a plastic or semi-plastic state. Of course, such a condition will depend on the volatile content, chemical constituents and original moisture present. Thus, if the coal contains a high percentage of volatile matter the state of plasticity becomes more defined than on coals with a lower content, but in all cases the chemical characteristics in the coal will exert an influence upon its change to the plastic or semi-plastic state.

It will be understood that the moisture contained in the coal will generally be evaporated during the early part of the process. In other words the moisture will evaporate from the coal and exude with the gases when boiling temperature is reached during the early passage of the coal through the retort. At this point, it may be subjected to a treatment with liquid coal tar pitch or other bitumen if required.

When the coal is fed into the retort, there is a slight tendency to cling to the shell of the retort and it is, as heretofore stated, an important feature of this invention to prevent the mass when it has progressed a sufficient distance and has reached the plastic stage from so sticking to the shell as to interfere with the continuous efficient operation.

By rotation of the retort at a predetermined rate, the semi-plastic or plastic coal mass formed as a result of its initial heating in the retort assumes an angular position of travel and moves in the direction of rotation toward the discharge end. This position varies from 40 to 50 degrees with respect to the horizontal, and is maintained substantially constant during rotation of the retort. By reason of the angularity of the exposed surface level of the coal and coke in the retort, and the rotation of the retort and due to the weight of the mass, when this angularity approaches a maximum, the mass, as will be clear, shifts or slides with respect to the wall of the retort, and thereby acts to scour the retort, preventing any sticking of the mass thereto or the clinging of portions thereof to the wall of the retort. This shifting, due to the angularity of the exposed surface level of the mass reaching a maximum, produces a densification, as well as a tumbling and breaking up of the mass. The uppermost part of the plastic mass separates continuously from the retort shell and rolls down the inclined plane formed by the adjacent mass which is moving up and again comes in contact with the bottom of the heated retort shell. It is this action which densifies the mass and forces it into close contact with the heated retort shell to produce the dense crust-like formation desired as well as the spherical shape of the final lumps. Thus, that part of the mass directly in contact with the hot retort shell will have the pressure of succeeding layers of the mass upon it, and between the mass and the retort shell there will be entrapped a sheet or layer of oily vapors of distillation which provide effectively the means of preventing the plastic mass from clinging to the retort shell as the vertical suspension point is approached by the upward moving mass in the rotating retort. Pieces will break away or separate from the mass and will, as stated, roll down across the full width of the incline formed by the plastic mass.

Under careful study and experimentation it was disclosed that with all such coals as would not form readily into lump shapes of desired density, this condition could be overcome by adding a proper percentage of coal tar pitch or other similar hydrocarbon of high melting point and mixing it with the coal. This can be accomplished by introducing the pitch in liquid form through the hollow shaft of the feed conveyor directly into the interior of the retort and to the desired point by extending the pipe far enough within the retort until the point is reached where the liquid as it mixes with the mass will produce best results. In some cases, a good location was found to be just over the semi-plastic mass, but it is quite possible to add the pitch to the coal before it is fed into the retort or while it is in the conveyor tube in which cases, means must be provided for cooling the conveyor screw to eliminate gumming or sticking.

It will be understood that the plastic mass moves in a direction and at the angle set forth toward the discharge end progressively by reason of two forces. These impelling factors are the constant flow of incoming coal from the feed screw which acts to raise the level of coal at the feed end of the retort; and the discrepancy in weight per cubic content between the coal as it enters at the forward end and the lump coke formed and discharged at the opposite end of the retort. As herein described, the plastic mass by reason of the rotation of the retort is lifted until the vertical suspension point for separation is reached when the uppermost part separates and rolls down and over the inclined plane formed by the upward moving mass. As the eduction of the vapors from the mass progresses, a gradual or progressive hardening takes place and the mass then breaks up into a lumpy condition. In this state, the outer surfaces are harder because they continuously come in contact with the heated surface of the retort and also roll thereon, and since the center of the lump shapes will remain plastic or in a semi-plastic state, the weight combined with the rolling action of lump over lump which takes place will finally form the lumps into the substantially round shapes. These spherical bodies are of less weight per cubical content due to the presence of voids between the lumps than either the plastic mass or the original coal fed into the retort. Therefore, the disparity in weight causes a crowding or congestion resulting in progressive movement in the retort toward the discharge end whence the lump shapes or semi-coke pass out when a level above that of the tube 41 is reached, and are delivered to the double chamber discharge box and subsequently to the endless carrying member therebeneath.

The rounded lump shapes as produced by my process have a hard exterior of crust-like formation and a semi-plastic interior and since they remain in the retort for a definite period after their substantial final formation and are subjected to the heat thereof, the eduction of vapors from their interior takes place unhindered and is to some extent accelerated through exothermic action in the lump shapes themselves. This exothermic action in the lumps may or may not be completed when the spherical semi-plastic bodies are discharged into the double chamber or bins. There are several factors which exert a controlling influence upon the exothermic action, as for instance where small sizes are produced they naturally go through or complete the process in much less time, whereas the larger sizes may require a longer period for complete exothermic results. In both cases, moreover, chemical constituents in the coal are to be considered and in order to have the final product uniform, the double chamber or bin construction is employed. The bins will have a large storage capacity and will maintain the lumps in a condition where the exothermic action can progress under most favorable conditions, since the discharge is insulated against heat loss.

Communication with the retort is likewise maintained, the gate 55 being open for a predetermined period while the bin is filling and heated gases which rise into the chamber 42 will quite naturally exert a heating action upon material discharging into the chamber 42. Moreover, the vapor or gases which are produced by the exothermic action in the double chamber will mix or pass off with the vapors drawn from the retort, thus eliminating any objectionable odors in the final product.

The heat control of the retort may be carried out in several ways, but I have found that by carefully adjusting the temperature, with relation to the speed of feed and R. P. M. of the retort, that the efficiency of the process and apparatus is very materially effected.

By reason of the large mass of material which constitutes a fixed ratio in the retort due to its cubical area, I may apply a uniform heat from the burners, throughout the longitudinal dimension of the retort. If this be the case, the speed of the feed, and incidentally the speed of rotation of the retort, will be adjusted in accordance with the characteristics of the coal so as to obtain a final product possessing the required qualifications.

On the other hand, the applied heat may be varied in accordance with the progress of material through the retort, it being, of course, understood, that the greatest heat absorption is at the feed end and the least at the discharge end. In the intermediate and later stages, of course, exothermic reactions occur and therefore, the applied temperature heat may be varied, but this type of heating is not contemplated.

However, it will be observed that either the temperature constant can be controlled and the feed and rotation of the retort remain constant, or the temperature may be made a constant and the treatment controlled by the movement of the feed conveyor and the retort.

The diffusion of heat through the mass is effective to produce the coke lumps above referred to for the reason that the mass is concentrated over a relatively short length in the retort, and, therefore, by virtue of the continuously tumbling of the mass in the retort, the heat will diffuse through the deep layer of the mass with reasonable uniformity whether temperature gradients be employed or not.

Heretofore, it has only been possible to treat a thin layer of coal in a long inclined retort and subject it to a zoned heat control. With the present invention, however, the temperature may be maintained uniform throughout the retort.

The preheating of the coal before it enters the retort is desirable and where a high moisture content is present, for example in washed coal, in order to have a large through-put, drying is a desirable expedient.

With the present invention the drying is accomplished preferably with the air excluded, as for example with the apparatus illustrated in Figure 17, although it will be clear that by lengthening the tube 16, and permitting it to contact for a considerable distance with heated gases, or by permitting it to come in contact with the fire, this preheating could be readily accomplished.

The present invention, however, can be used with plants where preheating is not economically possible and in fact wherever there is a low moisture content, without the necessity of heating and, therefore, at considerable saving.

It will be understood that with the present invention an increase in diameter of the retort produces automatically an increase in the amount of coal in the retort before any discharge can take place and this amount is substantially fixed at all times because both the feeding and discharge tubes are in the nature of cylinders indicated respectively at 20 and 41, of restricted diameter much smaller than the diameter of the retort. Therefore, with small coaxial tubes of this character, the coal under treatment must always be at a uniform height in the retort and the level will necessarily have to reach a point above the bottom of the discharge cylinder before any discharge can take place. Obviously, the amount of coal fed into the retort will not change the level of the coal, for as previously set forth above, an increase in feeding will automatically cause an increased discharge.

It will also be seen that by employing a retort which is maintained horizontal over the fire-bed, that all need for a long inclined retort is obviated and, moreover, it is not necessary with the present invention to have any mechanical means such as lifting means for discharging the treated coal. In the present invention, the provision of the double bins communicating with the discharge tubes and with the retort makes it unnecessary to provide any mechanical discharge as is customary wherein the coke must be removed as soon as it reaches the discharge point. With the present invention, when the coal level raises above the bottom of the discharge tube the coke lumps pass through the tube and into the bins.

The density of the lump shapes as herein set forth is due to the pressure exerted by the mass undergoing carbonization and distillation in the retort, which mass is maintained substantially fixed at approximately one-half the cubical area of the retort.

The coke lumps produced by this invention weighed between fifty and sixty pounds per cubic foot as compared with ordinary coke which has a weight of from twenty-five to thirty pounds. The size of the coke lumps may be readily controlled by the degree of heating and the speed of feeding and rotation, but in each case they will be ultimately formed and obtained in spherical shape.

I claim:

1. A process of coking coal for producing dense lumps of coke, which comprises continuously feeding coal into a heated rotary retort chamber and maintaining the quantity of coal and coke therein at substantially one-half the cubical area of the chamber, rotating the retort at a speed to produce tumbling of the coal and coke therein and shifting of the mass, externally heating the retort and maintaining the coal at a substantially uniform coking temperature, thereby forming lumps of coke having an exterior crust and weighing not substantially less than the weight of the original coal, and discharging the lumps of coke from the retort.

2. A process of coking coal for producing dense lumps of coke, which comprises continuously feeding coal into a heated rotary retort chamber and maintaining the quantity of coal and coke therein at substantially one-half the cubical area of the chamber, adding a bitumen to the coal, rotating the retort at a speed to produce tumbling of the coal and coke therein and shifting of the mass, externally heating the retort and maintaining the coal at a substantially uniform coking temperature, thereby forming lumps of coke having an exterior crust and weighing not substantially less than the weight of the original coal, and discharging the lumps of coke from the retort.

3. A process of coking coal for producing dense lumps of coke, which comprises premixing a bitumen with the coal, continuously feeding coal and bitumen into a heated rotary retort chamber and maintaining the quantity of coal and coke therein at substantially one-half the cubical area of the chamber, rotating the retort at a speed to produce tumbling of the coal and coke therein and shifting of the mass, externally heating the retort and maintaining the coal at a substantially uniform coking temperature, thereby forming lumps of coke having an exterior crust and weighing not substantially less than the weight of the original coal, and discharging the lumps of coke from the retort.

4. A process of coking coal for producing dense lumps of coke, which comprises preheating the coal, continuously feeding the coal into a heated rotary retort chamber and maintaining the quantity of coal and coke therein at substantially one-half the cubical area of the chamber, rotating the retort at a speed to produce tumbling of the coal and coke therein and shifting of the mass, externally heating the retort and maintaining the coal at a substantially uniform coking temperature, thereby forming lumps of coke having an exterior crust and weighing not substantially less than the weight of the original coal, and discharging the lumps of coke from the retort.

GUSTAV KOMAREK.